Feb. 4, 1941.　　　G. I. WICK　　　2,230,919

FISHING LURE

Filed May 10, 1939

Glenn I. Wick
INVENTOR.

BY *C. A. Knowles*
ATTORNEYS.

Patented Feb. 4, 1941

2,230,919

UNITED STATES PATENT OFFICE

2,230,919

FISHING LURE

Glenn I. Wick, St. Paul, Minn.

Application May 10, 1939, Serial No. 272,910

2 Claims. (Cl. 43—42)

This invention relates to fish lures or artificial bait, the primary object of the invention being to provide an artificial bait which will simulate the movement of a frog, to attract fish.

Another object of the invention is to provide a fishing bait of the artificial character, having means to agitate the water to attract fish to the bait.

A further object of the invention is to provide an artificial fishing bait which carries fish hooks arranged in such a way that the casting line will not become entangled with the hook, during the casting of the artificial bait.

With the foregoing and other objects in view which will appear as the description proceeds, the invention resides in the combination and arrangement of parts and in the details of construction hereinafter described and claimed, it being understood that changes in the precise embodiment of the invention herein described, may be made within the scope of what is claimed, without departing from the spirit of the invention.

Referring to the drawing.

Figure 1:
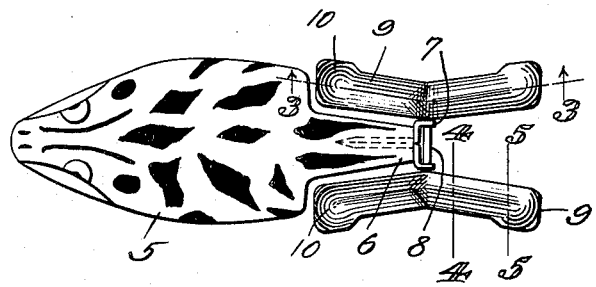
Figure 1 is a plan view of an artificial bait, constructed in accordance with the invention.
Figure 2:
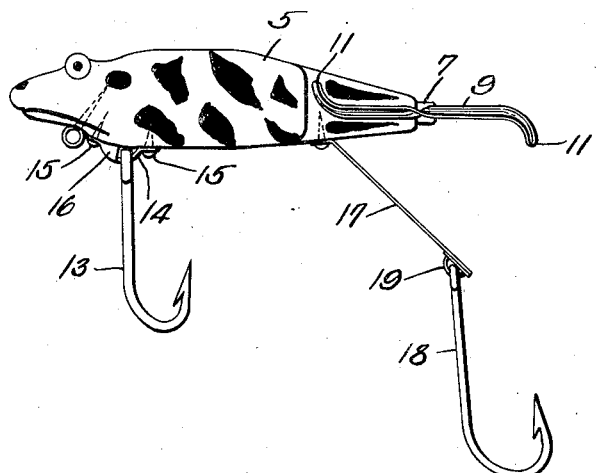
Figure 2 is a side elevational view thereof.
Figure 3:
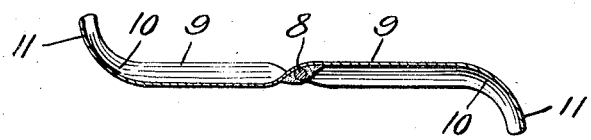
Figure 3 is a sectional view taken on line 3—3 of Figure 1.
Figure 4:
Figure 4 is a sectional view taken on line 4—4 of Figure 1.
Figure 5:
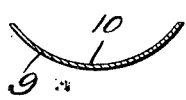
Figure 5 is a sectional view taken on line 5—5 of Figure 1.

Referring to the drawing in detail, the reference character 5 designates the body portion of the artificial fishing bait, which is constructed of any suitable material, and preferably of a formation to simulate a frog.

At the rear end of the body portion is an extension 6, to which the bearing 7 is secured, the bearing 7 having openings providing bearings for the shaft 8 to which the blades 9 are secured at points intermediate the ends of the blades.

These blades are arranged at opposite sides of the body portion, at the rear thereof, and each blade comprises a length of sheet metal material bent intermediate its side edges providing cupped surfaces 10, the ends of the blades 9 being curved as at 11, so that the water striking the curved cupped surfaces of the blades, will cause the blades to rotate.

As clearly shown by Figure 1 of the drawing, these blades curve outwardly, from points intermediate the ends thereof to impart a decided up and down movement to the body portion, as the bait is being retrieved, after the cast.

A hook indicated by the reference character 13 hangs from the forward end of the body portion, and is supported by means of the securing member 14, which is held in position on the body portion, by means of the headed fasteners 15.

The reference character 16 designates a bumper which is disposed adjacent the securing member 14, near the front end thereof, the bumper providing a stop against which the hook 13 engages, limiting movement of the hook 13 towards the front end of the body portion, or end of the body portion to which the casting line is secured, thereby insuring against the hook becoming caught in the casting line, to prevent the proper casting of the artificial bait.

Secured to the under surface of the body portion near the extension 6, is a spring wire member 17, to which the hook 18 is secured, the hook 18 being held to the member 17, by means of the securing member 19 which is spaced from the free end of the member 17, providing a stop for the hook 18, to prevent the hook from swinging too far towards the rear of the body portion, and preventing the hook from becoming entangled in the casting line.

From the foregoing it will be seen that due to the construction shown and described, I have provided an artificial fishing bait which will not in any way interfere with the usual casting operation, and an artificial bait which will, when retrieved after a cast, cause the body portion or bait to move up and down over the surface of the water, simulating the movements of a live frog.

This movement is imparted to the body portion owing to the rotation of the blades 9, the blades at the same time acting to agitate the water to attract the attention of the fish.

What is claimed is:

1. An artificial fishing bait comprising a body portion, one end of the body portion being constructed to simulate the head of live bait, the opposite end of the body portion having its side edges cut-away providing a narrow tail portion, a shaft mounted at the free end of the narrow tail portion and disposed transversely thereof, pairs of blades mounted at the ends of the shaft, said blades being inclined laterally from points intermediate the ends thereof, said blades being also transversely curved and shaped to simulate legs of live bait, and fish hooks secured to the body portion.

2. An artificial bait comprising a body portion, one end of the body portion being constructed to simulate the head of live bait, the opposite end of the body portion having its side edges cutaway providing a narrow tail strip, a shaft mounted transversely of the tail strip at the free end thereof, pairs of blades mounted on the ends of the shaft, said blades extending an appreciable distance beyond the ends of the tail piece of the body portion, said blades being transversely curved providing scoops adapted to scoop the water as the body portion is being pulled through the water, causing the blades to rotate, and fish hooks secured to the body portion.

GLENN I. WICK.